United States Patent
Thommen et al.

(10) Patent No.: US 7,775,707 B2
(45) Date of Patent: Aug. 17, 2010

(54) METHOD FOR ACTIVATION OF TEMPERATURE TIME MONITORS AND TEMPERATURE TIME MONITORS OPERATING THEREWITH

(75) Inventors: Werner Thommen, Zurich (CH); Goerg Weber, Walenstadt (CH)

(73) Assignee: Q-tag AG, Ganterschwil (CH)

( * ) Notice: Subject to any disclaimer, the term of this patent is extended or adjusted under 35 U.S.C. 154(b) by 330 days.

(21) Appl. No.: 11/841,167

(22) Filed: Aug. 20, 2007

(65) Prior Publication Data
US 2008/0041705 A1 Feb. 21, 2008

(30) Foreign Application Priority Data
Aug. 18, 2006 (DE) ................. 10 2006 038 913

(51) Int. Cl.
*G01K 3/00* (2006.01)
(52) U.S. Cl. ............... 374/102; 374/103; 374/106
(58) Field of Classification Search ............ 374/102, 374/103, 106, 107, 108
See application file for complete search history.

(56) References Cited
U.S. PATENT DOCUMENTS
5,359,168 A * 10/1994 Cunningham ........... 200/61.08

5,835,781 A * 11/1998 Van de Steeg et al. ......... 712/1
2004/0156418 A1* 8/2004 Debord et al. ............. 374/103

FOREIGN PATENT DOCUMENTS
DE 4315668 A1 11/1994

* cited by examiner

*Primary Examiner*—Gail Verbitsky
*Assistant Examiner*—Mirellys Jagan
(74) *Attorney, Agent, or Firm*—Browdy and Neimark, PLLC

(57) ABSTRACT

The invention relates to an activation of temperature time monitors (1), particularly for perishable products, such as medications, vaccines, stored blood, or food products, wherein the monitor (1) contains at least one electrical circuit (4-6), which is mechanically activateable/changeable, characterized in that the monitor (1) is activatable by means of an irreversible mechanical interruption of an electrically conductive connection (8) of the at least one electrical circuit (4-6), or that the monitor (10) is activatable by means of an irreversible mechanical removal of an electrically conductive area (15) of the at least one electrical circuit (16, 17). The invention is based on the object of improving an activation of temperature time monitors in such a way what it is particularly cost effective and reliable, and that an automated activation is possible.

3 Claims, 3 Drawing Sheets

METHOD FOR ACTIVATION OF TEMPERATURE TIME MONITORS AND TEMPERATURE TIME MONITORS OPERATING THEREWITH

BACKGROUND OF THE INVENTION

The invention relates to a method for activation of temperature time monitors, and temperature time monitors operating therewith, according to the precharacterizing portion of claim 1.

Perishable products, such as medications, vaccines, stored blood, but also food products, have already been monitored with various chemical or electronic monitors for a long time. This is done especially by recording and analyzing time/temperature data and indicating if certain threshold values are being exceeded.

In the case of a monitor that includes a registering or integrating function, it is important that the precise start time is selectable. Various methods for a starting or activating, respectively, of the monitor and its function, respectively, have already been applied up to now:
- by push button or switch (Q-tag, Tag Alert, Coolwatch, etc.)
- by plug-type contacts (Spyco)
- by infrared signal
- by RF signal (Schreiner labels)
- by removal of an insulating strip (Freezeye).

All of these methods are relatively involved and/or they have reliability problems.

SUMMARY OF THE INVENTION

The invention is therefore based on the object of improving a method for activation of temperature time monitors, and temperature time monitors of the type mentioned at the outset operating therewith, in such a way that the activation is particularly cost-effective, that it works reliably, and that an automatic activation of a large number of temperature time monitors disposed on a carrier tape is possible as well.

To meet this object, the invention is characterized according to a first inventive idea by the subject matter of claim 1.

The present invention describes two methods, which are particularly cost-effective and reliable and particularly suitable for an automatic processing at high cadence (high throughput, i.e., large piece numbers per time unit).

Method 1: a conductive connection is interrupted

Method 2: a conductive area is peeled off from the enclosure. This conductive area is isolated from the remaining circuit. The area acts as a capacitor. The change in capacitance is detected, causing the monitor to be activated.

Both methods have the advantage that they supply permanent and unambiguous information to the monitor. A verification of the activation is therefore no longer necessary.

It is an advantage of the above-mentioned activation mechanisms that, upon separating a previously existing, current-carrying electrical connection, the current flow is now eliminated and a particularly reliable detection of the now eliminated current flow is provided in this manner. Such a detection of an eliminated current flow is particularly reliable, because interference voltages, electromagnetic interferences and the like will not cause an erroneous signal.

It is an additional advantage that one can detect the interrupted electrical connection if it is disposed outside the enclosure. For this purpose, provision is made that a break-off tab, through which the current flow is routed, is disposed on the outside of the monitor enclosure. If the tab is broken off, the current flow is interrupted as well and detected by the circuit that is disposed in the interior of the enclosure.

This provides for an increased reliability in such a way that being able to see the breakaway zone from the outside, one is now able to make a reliable visual determination that the monitor was in fact activated.

This is not the case with a contact activation of a monitor, since one cannot detect in the case of contact circuits, whether or not the contact was activated.

In the case of the present invention, an irreversible interruption of an arrangement of conductors is performed for that reason, which is significantly more reliable, also with respect to this interruption being visually verifiable as well.

According to the second inventive idea, a conductive area, which is isolated from the remaining circuit, is peeled off from the enclosure.

This area acts as a capacitor. There are various ways by which this area can be implemented as a capacitor, all of which shall be encompassed by the inventive idea of the present invention.

In a first embodiment, provision is made that a metallized plastic film or other metallic film sheet is glued onto the outside of the monitor and is simply torn off.

This causes the capacitor coating of two capacitors that are disposed in the interior of the enclosure to change, which is detected as a capacitance change of the two capacitor coatings disposed in the interior.

This circuit configurations too, is irreversible. This means that when the capacitor area on the outside is torn off or removed in some other manner, the circuit assumes this altered switched state once and maintains it. A reversible state is not provided for.

In lieu of affixing a metallized plastic film or other metallic conductive member, it is also possible to use metallized plastic particles or metallized adhesives, so that the exterior film area that functions as a capacitor surface, can be scratched off, for example, or removed in some other manner.

Consequently, all removal mechanisms are claimed as essential for the invention that are aimed at the removability of an exterior electrically conductive area (capacitor surface) that is disposed on the outside of an enclosure.

In a preferred automating method, provision is made that a plurality of temperature monitors adhering to a tape are successively activated in series. For this purpose a tape is removed from the monitor enclosures—according to the second inventive idea—so that this tape practically represents the exterior removable conductive areas and the affected monitor is thereby optionally activated in each case.

The activation of the breakable breakaway zone takes place in the same manner. In this case the individual monitor enclosures are printed in the style of credit cards on a multiple-use printed circuit board and severed by means of breakaway zones from the remaining plastic surfaces of this tape.

Through appropriate pressure or by means of an ejector, the individual monitor enclosures can now be detached from the carrier tape and with this detachment a breakaway zone is simultaneously broken off that is separated by the electrically conductive connection.

This breaking of the breakaway zone thus also interrupts the electrical connection of the activation mechanism and the activation is therefore triggered.

Depending on the actuation of the individual ejectors, the individual temperature time monitors can be activated successively in this manner, or also simultaneously at the same time.

In other respects it is unimportant how said temperature time monitors are manufactured. They may consist of individual discrete components and may be assembled on a regular circuit board.

In another embodiment, which, however, is also about thin-film components, they are printed on suitable polyester tapes using a printing process, so that very thin temperature time monitor enclosures with a small footprint are attained. They then have the style and character of credit cards.

The invention will be explained in more detail below, with the aid of drawings that depict a number of implementation routes. Additional features that are essential for the invention and advantages of the invention will become apparent from these drawings and from their description.

BRIEF DESCRIPTION OF THE DRAWINGS

In the drawings,

FIG. 4a shows a cross section through the carrier tape and through a monitor according to FIG. 4;

FIG. 4b shows the situation shortly after separating the monitor from the carrier tape according to FIGS. 4 and 4a.

FIG. 5b shows the situation shortly after the separation of the monitor from the carrier tape of FIGS. 5 and 5a.

DETAILED DESCRIPTION OF THE INVENTION

Figure 1:
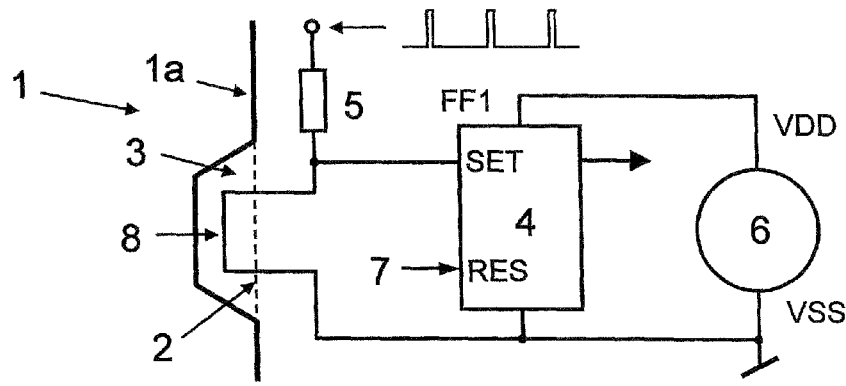
FIG. 1 shows a circuit for activation of the monitor by means of separating a connection according to a first inventive idea, namely the activation of the monitor by separating a connection.

According to the first inventive idea (activation of the monitor 1 by interrupting a connection) of FIG. 1, an RS latch (FF1) 4 serves as the control element for activation of the monitor 1. When the battery is connected, the RS latch 4 is placed in the "OFF" state through a power-on-reset signal (POR) 7. The set input of the RS latch 4 is connected in a fixed connection to the negative battery voltage VSS of the supply voltage 6 by means of the connection that will later be severed (breakaway zone 2 in a tab 3 of the monitor enclosure edge 1a). Via the resistor 5 (e.g., 100 KOhm) a short read pulse with the amplitude of the positive battery voltage is periodically applied to the set input. A positive set pulse can occur only when the conductive connection 2 to the negative battery voltage VSS of the supply voltage 6 is interrupted. The first set pulse places the RS latch 4 in the "ON" state, which is maintained as long as the supply voltage 6 is present, since a "reset" is triggered only by a POR signal 7.

Figure 2:
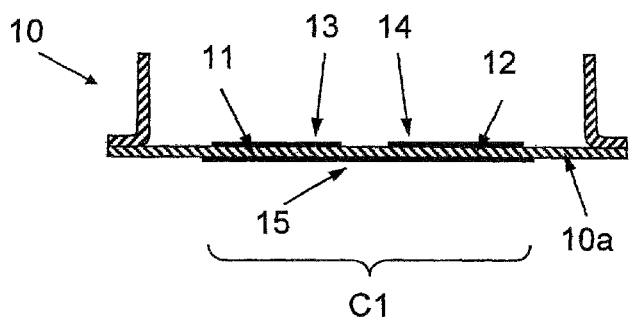
FIG. 2 shows a section through the monitor enclosure at the location where the removable conductive area is affixed on the outside according to a second inventive idea, namely the activation of the monitor by removal of a conductive area from the monitor enclosure.

In accordance with the second inventive idea (activation of the monitor 10 through removal of a conductive area 15 from the monitor enclosure 10a) according to FIG. 2, the capacitance C1 consists of a series connection of the two capacitances 11 and 12. Both capacitances 11 and 12 consist of an electrode surface 13, 14 inside and an electrode surface 15 outside the monitor enclosure 10a in each case. The monitor enclosure 10a forms the dielectric of the capacitances 11 and 12, and the electrode surface 15 outside the monitor enclosure 10a is at the same time the electrical connection of the two capacitances 11 and 12.

For an unambiguous detection of the two states (deactivated/activated), only the following two conditions need to be met:

a) Conductive area 15 present on enclosure 10a—series connection of the two capacitances 11 and 12 greater than the capacitance C2 parallel thereto.

b) Conductive area 15 removed from enclosure 10a—stray capacitances between the two capacitances 11 and 12 smaller than the capacitance C2 parallel thereto.

Since the capacitance comparator has a very high-ohm input, it reacts sensitively to external interference voltages. In most cases a noise voltage rejection will therefore be required. By way of example, the circuit of FIG. 2 is given a configuration (counter) that switches only if multiple (e.g. a number of 64) read pulses are detected successively without interruption as "HIGH".

Figure 3:
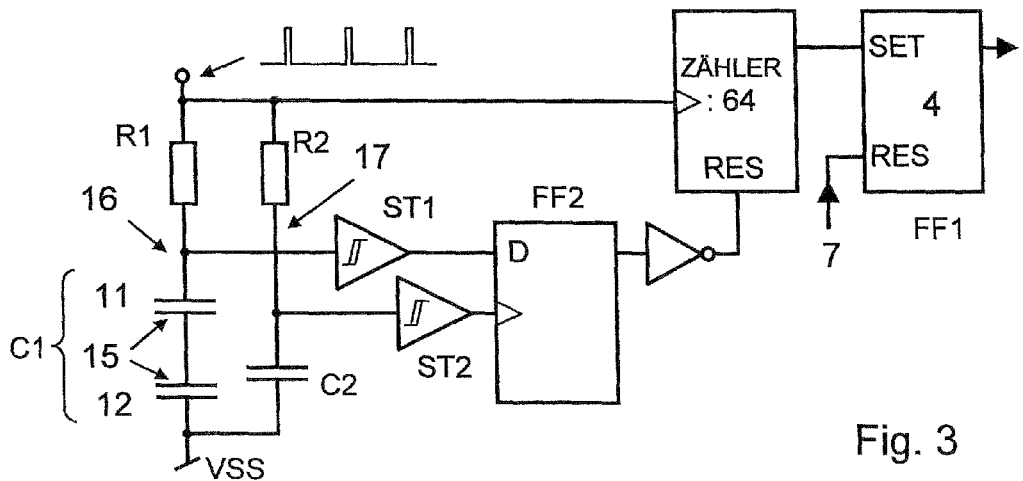
FIG. 3 shows a circuit example for the second inventive idea according to FIG. 2.
Figure 4:
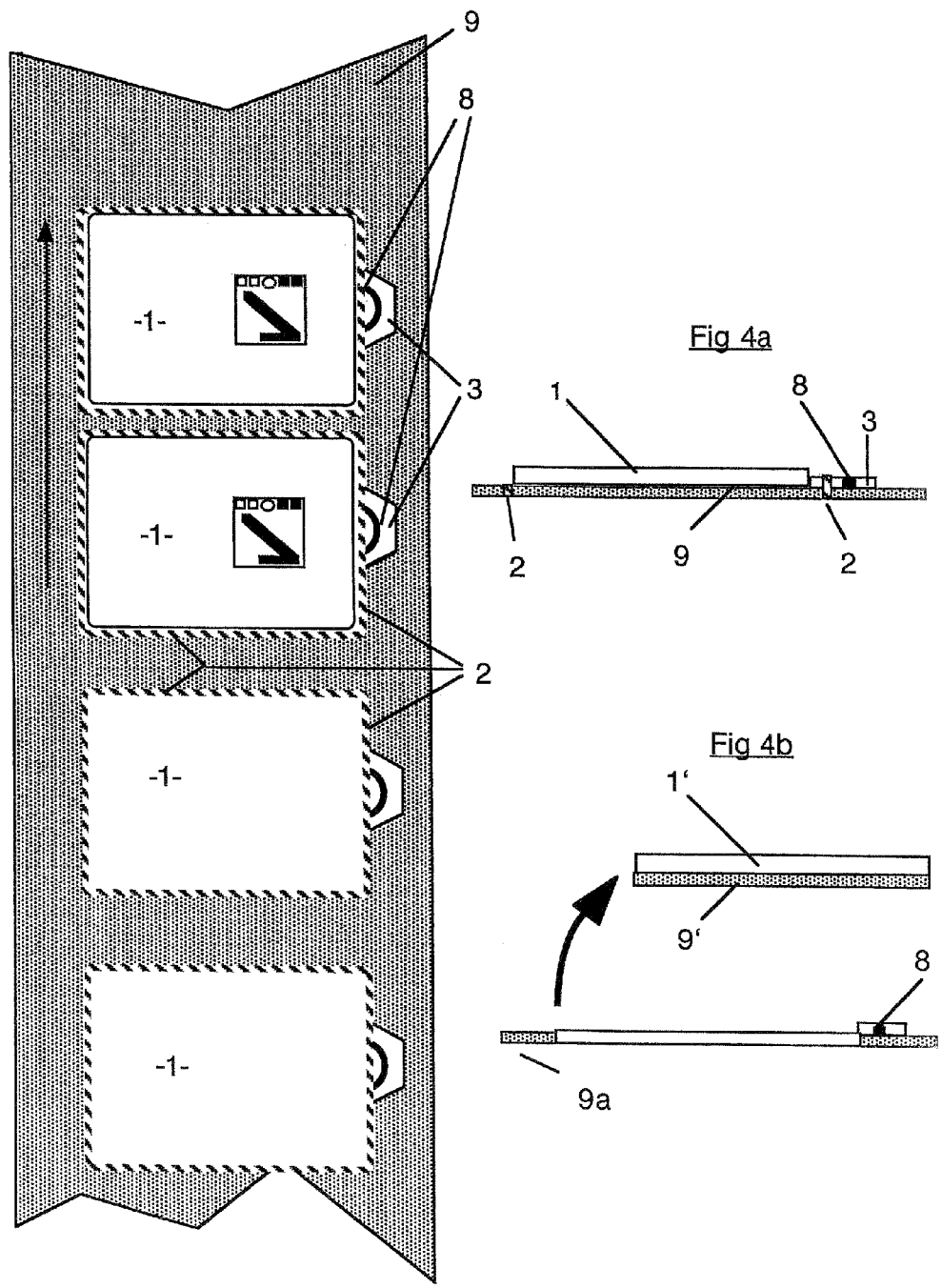
FIG. 4 shows a configuration and method for activation of a plurality of monitors that are disposed in series on a carrier tape for the first inventive idea according to FIG. 1.

FIG. 3 now shows a circuit example for the second inventive idea of FIG. 2, with a capacity comparator being depicted that detects the capacity change of the capacitors 11 and 12 caused by the removal of the conductive area 15 affixed on the outside of the monitor enclosure 10a. Like in the first method according to FIG. 1, the control element for the activation of the monitor 10 is an RS latch (FF1), which is placed in the "OFF" state at the beginning by means of a POR signal 7. The capacity comparator consists of the RC modules 16 and 17 and D-flipflop FF2. The RC module 16 is connected via the Schmitt trigger ST2 to the clock of the D-flipflop FF2. The RC modules 16, 17 are periodically activated through a short read pulse. If the Schmitt trigger ST1 switches before the Schmitt trigger ST2, a "HIGH" is read in. This means that the output of the D-flipflop FF2 is "LOW" if the signal of the RC module 16 is greater than that of the RC module 17, and "HIGH" if the signal of the RC module 16 is smaller than that of the RC module 17. FIG. 4 shows the activation of the monitor 1 through separation of a breakaway zone 2 on an assembly tape 9, with FIG. 4a showing a cross section through the assembly tape and through the monitor 1, and FIG. 4b showing the situation after the separation of the activated monitor 1' together with the tape segment 9' from the residual tape 9a on which the severed start tab 8 remains behind.

A plurality of temperature monitors 1 adhering to a tape 9 can be successively activated in series in this manner. The individual monitor enclosures 1a a can be printed in the style of credit cards on a multiple-use printed circuit board and separated via breakaway zones 2 from the remaining plastic surfaces of this tape 9.

Through appropriate pressure or by means of an ejector, the individual monitor enclosures 1a can now be detached from the carrier tape 9, and with this detachment a breakaway zone 2 is simultaneously broken that is permeated by the electrically conductive connection 8 (start tab) in the tab 3. This breaking of this breakaway zone 2 thus also interrupts the electrical connection 8 of the activation mechanism and the activation of the monitor 1' is therefore triggered. Corresponding to the actuation of the individual ejectors, the individual temperature time monitors can thus be activated successively in this manner, or also simultaneously at the same time.

Figure 5:
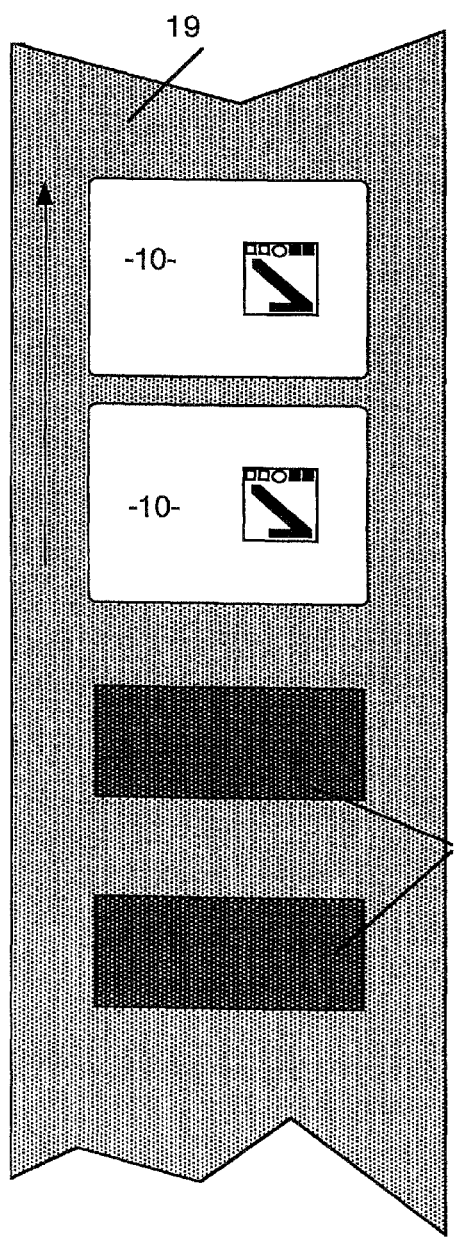
FIG. 5 shows a configuration and method for activation of a plurality of monitors that are disposed in series on a carrier tape for the first inventive idea according to FIG. 1.
Figure 5A:
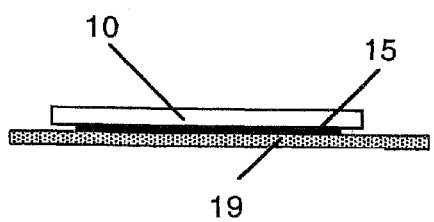
FIG. 5a shows a cross section through the carrier tape and through a monitor according to FIG. 5.
Figure 5B:
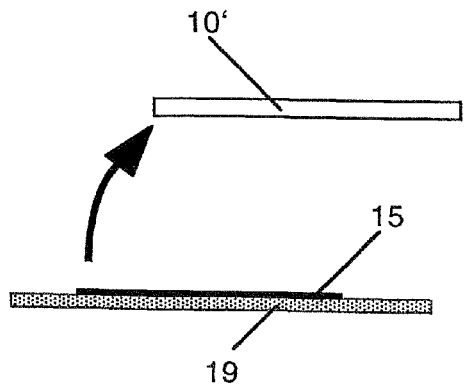

FIG. 5 shows the activation of the monitor 10 through detachment from a conveyor tape 9 that is provided with an electrically conductive area 15, with FIG. 5*a* showing a cross section through the assembly tape and monitor 10 and FIG. 5*b* showing the situation after detachment of the activated monitor 10' from the conveyor tape 19 on which the electrically conductive area 15 remains behind.

A plurality of temperature monitors 10 that are adhering to a tape can be successively activated in series. For this purpose the tape 19 is detached from the monitor enclosures 10*a* in such a way that this tape 19 practically represents or contains the external removable conductive areas 15 and the affected monitor 10' is optionally activated in this manner in each case.

Drawing Legend

1 Monitor; 1*a* monitor enclosure edge, 1' activated monitor
2 Breakaway zone
3 Tab
4 RS latch
5 Resistor
6 Supply voltage
7 POR signal
8 Start tab (electrical conductor)
9 Carrier tape/assembly tape/conveyor tape; 9' tape segment on 1'; 9*a* residual tape
10 Monitor; 10*a* monitor enclosure, 10' activated monitor
11 Capacitor
12 Capacitor
13 Electrode
14 Electrode
15 Conductive area
16 RC module
17 RC module
18 —
19 Conveyor tape

What is claimed is:

1. A method for activation of temperature time monitors (1), particularly for perishable products, wherein each monitor (1) contains at least one electrical circuit (4-6), which is activated mechanically, comprising:

each monitor (1) is activated by means of an irreversible mechanical interruption of an electrically conductive connection (8) of the at least one electrical circuit (4-6), wherein a plurality of monitors (1) are disposed on a tape (9) lying flat in series and/or in parallel behind one another, particularly printed-on, and for activation of the monitors (1) each monitor (1) is removed from the tape (9) in such a way, particularly broken off along a breakaway zone (2), that the electrically conductive connection (8) remains behind on the tape (9).

2. A method for activation of temperature time monitors (1) according to claim 1, wherein the monitor (1) is accommodated inside an enclosure (1*a*) and the electrically conductive connection (8) is routed through, inside a removable tab (3) at the edge of the enclosure (1*a*), and the removable tab (3) is severed along the breakaway zone (2) from the edge of the enclosure (1*a*) along with the electrically conductive connection (8) for the activation of the monitor (1).

3. Temperature time monitors (1) operating according to the method for activation according to claim 1, wherein the electrical circuit (4-6) comprises an RS latch (4) whose set input is connected to the separable electrically conductive connection (8), which is connected to a supply voltage (6) for the electrical circuit (4-6).

\* \* \* \* \*